United States Patent
Butrie et al.

[11] Patent Number: 5,838,859
[45] Date of Patent: Nov. 17, 1998

[54] BIDIRECTIONAL OPTICAL TRANSCEIVER ASSEMBLY

[75] Inventors: Timothy Butrie, Orefield, Pa.; Shigemasa Enoeda, Okaya, Japan; Joseph Edward Riska, Macungie, Pa.; Stephen James Salko, Weatherly, Pa.; Thomas Stanley Stakelon, Allentown, Pa.; Alka Swanson, San Diego, Calif.; Toshimichi Yasuda, Okaya, Japan

[73] Assignee: Lucent Technologies Inc., Murray Hill, N.J.

[21] Appl. No.: 756,220

[22] Filed: Nov. 25, 1996

Related U.S. Application Data

[60] Provisional application No. 60/009,428 Dec. 28, 1995.
[51] Int. Cl.$^6$ .................................................. G02B 6/36
[52] U.S. Cl. ................................ 385/92; 385/88; 385/93
[58] Field of Search ................................. 385/92, 88–94

[56] References Cited

U.S. PATENT DOCUMENTS

| | | | |
|---|---|---|---|
| 5,127,075 | 6/1992 | Althaus et al. | 385/92 X |
| 5,291,571 | 3/1994 | Kunikane et al. | 385/93 |
| 5,347,605 | 9/1994 | Isaksson | 385/92 |
| 5,408,559 | 4/1995 | Takahashi et al. | 385/89 |

*Primary Examiner*—Phan T. H. Palmer
*Attorney, Agent, or Firm*—L. H. Birnbaum

[57] ABSTRACT

An optical transceiver assembly for use in a bidirectional system includes a beam splitter to direct an incoming signal to a photodiode. An outgoing signal from a laser diode is partially transmitted and partially reflected by the splitter. The reflected signal, which may reach the photodiode, constitutes crosstalk which is reduced by orienting the polarization direction of the splitter essentially parallel to that of the outgoing signal from the laser diode. In another embodiment, which enhances coupling efficiency, a single element asphere lens is positioned between the laser diode and the splitter.

4 Claims, 1 Drawing Sheet

BIDIRECTIONAL OPTICAL TRANSCEIVER ASSEMBLY

CROSS-REFERENCE TO RELATED APPLICATION

This application claims priority of Provisional Application Ser. No. 60/009,428 which was filed on Dec. 28, 1995.

BACKGROUND OF THE INVENTION

This invention relates to bidirectional fiber optic communication systems and, more particularly, to a transceiver assembly for use in such systems.

In a typical bidirectional fiber optic communication system, such as a fiber-in-the-loop (FITL) system, optical signals propagate in both directions over a single optical fiber. Terminal equipment at each end of the fiber includes a transceiver which launches an outgoing signal onto the fiber and which receives an incoming signal from the same fiber. The outgoing and incoming signals may have the same wavelength or different wavelengths. Generally, within the transceiver assembly the outgoing and incoming signals are directed over separate optical paths between the fiber and either a light source (e.g., a laser diode) and a light detector (e.g., a photodiode). Most designs incorporate a beam splitter which partially transmits the outgoing signal from the laser diode to an output fiber (e.g., a fiber pigtail) and partially reflects the incoming signal to the photodiode. The remaining portion of the outgoing signal is also reflected by the beam splitter to incidence upon various surfaces internal to the assembly. These surfaces further reflect or scatter the signal. (For simplicity, we will refer to these as "reflections".) Some of the reflections of the outgoing signal reach the photodiode and constitute crosstalk when the system is operated in a full duplex mode. That is, the photodiode is intended to detect only the incoming signal, not reflected portions of the outgoing signal. To the extent that the latter is detected, it constitutes noise or crosstalk. A need remains in the art for reducing such crosstalk. There is also a need to reduce crosstalk without significantly degrading coupling efficiency to the fiber.

SUMMARY OF THE INVENTION

A transceiver assembly in accordance with one embodiment of the invention includes a housing in which a light source, lens, beam splitter, photodetector and an optical fiber are mounted. The lens focuses an outgoing optical signal from the source through the splitter to the end face of the fiber. The splitter directs an incoming optical signal to the photodetector. In order to reduce reflections of the outgoing signal from the splitter, and hence crosstalk, without also sacrificing significantly the coupling efficiency to the fiber, the polarization direction of the splitter is oriented essentially parallel to that of the source.

In another embodiment, the lens is a single element asphere. Coupling efficiencies in excess of 70% have been achieved using this design.

BRIEF DESCRIPTION OF THE DRAWINGS

The invention, together with its various features and advantages, can be readily understood from the following more detailed description taken in conjunction with accompanying drawing, in which.

DETAILED DESCRIPTION

Figure 1:
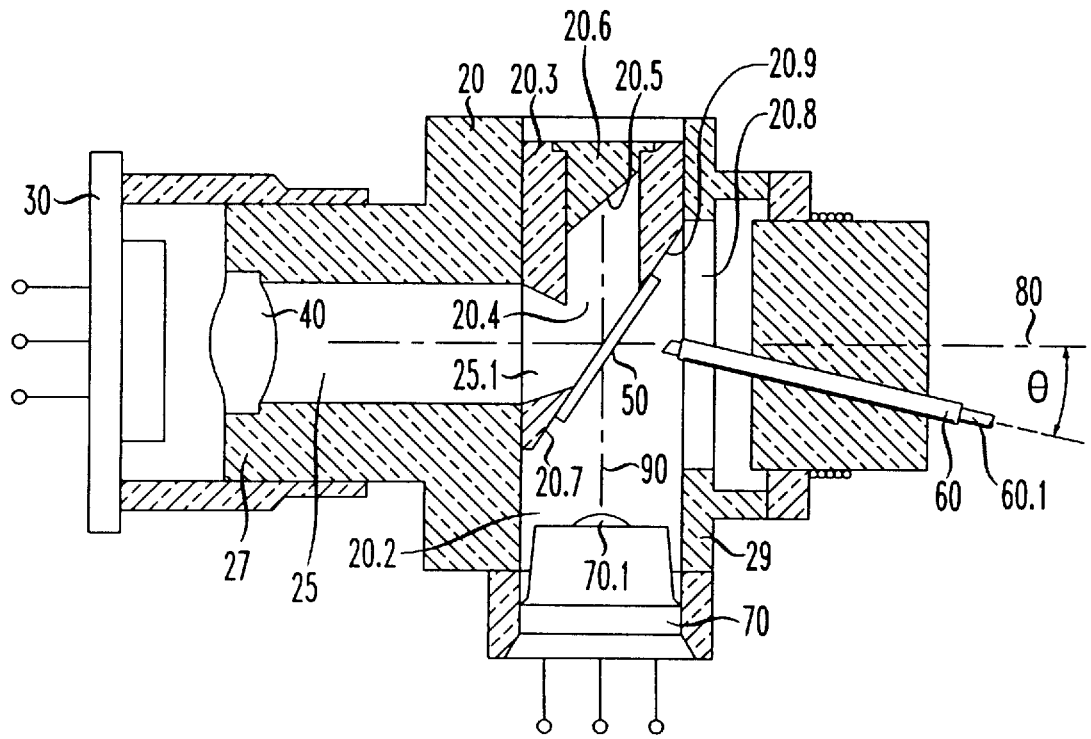
FIG. 1 is a somewhat schematic, partial cross-sectional view of a transceiver assembly in accordance with one embodiment of the invention.

A transceiver assembly 10 in accordance with an illustrative embodiment of the invention comprises a housing 20 in which several components are mounted: a light source, such as a laser diode package 30, for launching an outgoing optical signal; lens means 40 for focusing the outgoing signal through a beam splitter 50 into an optical fiber, such as a fiber pigtail 60; and a photodetector, such as a photodiode package 70, for detecting an incoming optical signal emanating from the fiber and reflected by the beam splitter 50. A lens 70.1 focuses the incoming signal onto a photodiode (not shown) located within package 70.

The housing includes a bore 25 which provides an optical communication path between the laser package 30 and the beam splitter 50. The end 25.1 of the bore adjacent the beam splitter has a conical shape. The laser package is mounted in a left peripheral section 27 of the housing, whereas the photodetector package 70 and beam splitter 50 are mounted in a central section 20.2. Splitter 50 is typically mounted at a 45° angle to the transmission axis 80. An aperture 20.8 located in a right peripheral section 29 allows the fiber 60 to be positioned to receive the outgoing signal propagating through splitter 50 and to direct the incoming signal onto the splitter.

Figure 2:
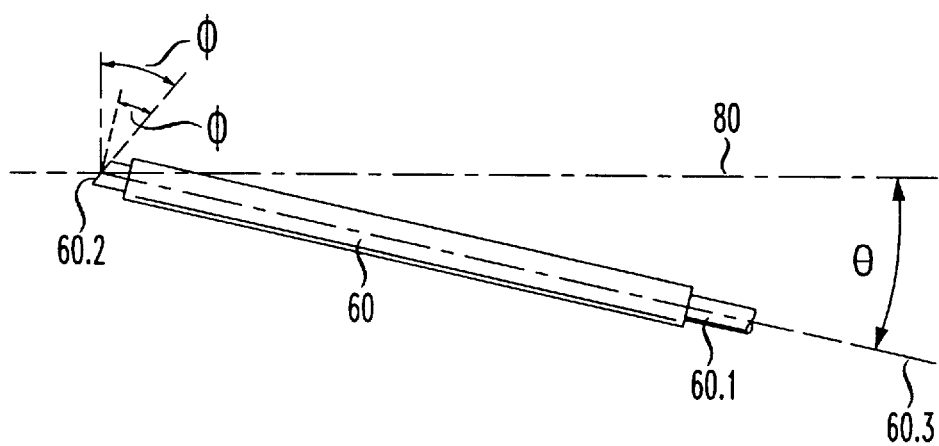
FIG. 2 is a schematic drawing showing how the optical fiber is beveled and tilted relative to the transmission axis.

The laser package, lens means, bore, splitter and the end face 60.2 (FIG. 2) of fiber 60 are aligned along transmission axis 80. Likewise, the photodetector package (i.e., lens 70.1) and the splitter are aligned along a transverse axis 90.

In accordance with one aspect of the invention, the central section 20.2 of housing 20 is provided with structural features that significantly reduce crosstalk; that is, reduce the amount of optical energy from the outgoing signal that reaches the photodiode in package 70. These structural features include a cavity 20.4 into which the outgoing signal reflected by splitter 50 is directed. To this end, the conical end portion 25.1 of bore 25 is optically coupled to cavity 20.4. Within the cavity an oblique surface 20.5 is positioned; that is, oblique surface 20.5 is disposed at an cute angle to transverse axis 90. Thus, most of the outgoing signal that enters the cavity is reflected off oblique surface 20.5 and is trapped within the cavity. Little escapes to have any significant chance of entering lens 70.1 of photodiode package 70.

In a preferred embodiment, the cavity 20.4 is formed in a cylindrical member 20.3 which fits into one end of central section 20.2 and which is aligned long transverse axis 90. Surface 20.5 is formed on the interior end of a plug 20.6 which is inserted into cavity 20.4 of member 20.3. In addition, end portion 25.1 of bore 25 is formed in member 20.3, and the beam splitter 50 is mounted on 45° surfaces 20.7 and 20.9 of member 20.3.

Although oblique surface 20.5 is depicted as being planar, it could be curved or take on more complex shapes. Moreover, surface 20.5 could be roughened or provided with a rough coating to decrease its light scattering properties. Or, it could be made of light-absorbing material or be provided with a light-absorbing coating.

Another aspect of the invention involves the orientation θ of fiber 60.1 relative to the transmission axis 80 and the orientation φ' of end face 60.2 of the fiber relative to the normal to the same axis and the orientation φ of the end face 60.2 relative to the normal to the fiber axis 60.3. More specifically, the end face 60.2 of the fiber may be beveled to further reduce reflections of the outgoing signal (i.e., from the fiber end face in this case), but this design may reduce coupling of the outgoing signal to the fiber. However, we have found that reduced reflections can be attained without significantly sacrificing coupling efficiency by tilting the beveled fiber 60 at a small angle θ relative to axis 80. In a preferred embodiment, φ≈2θ. For example, designs with the bevel angle φ≈8° and the tilt angle φ≈4 are suitable.

Yet another aspect of our invention which reduces crosstalk relates to the polarization orientation of the beam splitter 50. More specifically, this aspect of the invention contemplates that beam splitter 50 has its polarization direction oriented parallel to that of the outgoing signal (i.e., the light output of a typical laser diode is plane polarized). The polarization within a beam splitter is determined, as is well known in the art, by adjusting the thicknesses and compositions of the various layers of the multilayered structure of such a splitter. Of course, once that polarization direction within the splitter is known, then it is physically positioned relative to the laser diode to achieve the desired parallelism. In addition, coupling efficiency is improved by fabricating lens means 40 in the form of a single asphere lens. The curvature of the left hand surface of the asphere lens is designed to match the numerical aperture (NA) of the laser diode, whereas the curvature of the right hand surface is designed to match the NA of bore 25. Coupling efficiencies in excess of 70% have been realized with this design.

It is to be understood that the above-described arrangements are merely illustrative of the many possible specific embodiments which can be devised to represent application of the principles of the invention. Numerous and varied other arrangements can be devised in accordance with these principles by those skilled in the art without departing from the spirit and scope of the invention.

We claim:
1. An optical transceiver assembly comprising
   a housing,
   mounted in said housing, a plane polarized light source, a pane polarized beam splitter, an optical fiber, a photodetector, and a lens for focusing an outgoing optical signal from said source through said splitter into said fiber, said splitter being positioned to reflect an incoming optical signal on said fiber to said photodetector, CHARACTERIZED IN THAT
   said splitter is a non-birefringent device, and
   the polarization orientation of said splitter is essentially parallel to that of said plane polarized light source.
2. The assembly of claim 1 further characterized in that said source comprises a laser diode having a plane polarized light output.
3. The assembly of claim 1 further characterized in that said lens comprises a single asphere lens.
4. An optical transceiver assembly comprising
   a housing,
   mounted in said housing, a plane polarized laser diode, a plane polarized beam splitter, an optical fiber, a photodetector, and a single asphere lens for focusing an outgoing optical signal from said source through said splitter into said fiber, said splitter being positioned to reflect an incoming optical signal on said fiber to said photodetector, said source and said splitter being disposed along a first axis and said photodetector and said splitter being disposed along a second axis essentially perpendicular to said first axis, CHARACTERIZED IN THAT
   said splitter is a non-birefringent device, and
   the polarization orientation of said splitter is essentially parallel to that of said plane polarized laser diode.

\* \* \* \* \*